US009698854B2

(12) United States Patent
Mow et al.

(10) Patent No.: US 9,698,854 B2
(45) Date of Patent: Jul. 4, 2017

(54) ELECTRONIC DEVICE HAVING ANTENNA TUNING INTEGRATED CIRCUITS WITH SENSORS

(71) Applicant: Apple Inc., Cupertino, CA (US)

(72) Inventors: Matthew A. Mow, Los Altos, CA (US); Liang Han, Sunnyvale, CA (US); Ming-Ju Tsai, Cupertino, CA (US); Thomas E. Biedka, San Jose, CA (US); Victor Lee, Sunnyvale, CA (US); James G. Judkins, Campbell, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/980,574

(22) Filed: Dec. 28, 2015

(65) Prior Publication Data
US 2016/0204820 A1    Jul. 14, 2016

Related U.S. Application Data

(60) Provisional application No. 62/101,901, filed on Jan. 9, 2015.

(51) Int. Cl.
*H04M 1/00* (2006.01)
*H04B 1/40* (2015.01)
(Continued)

(52) U.S. Cl.
CPC ............. *H04B 1/40* (2013.01); *H04B 1/0458* (2013.01); *H04B 1/18* (2013.01)

(58) Field of Classification Search
USPC .......... 455/550.1, 552.1, 575.7, 63.1, 67.11, 455/67.13, 73
See application file for complete search history.

(56) References Cited

U.S. PATENT DOCUMENTS

| 8,204,446 B2 | 6/2012 | Scheer et al. | |
| 8,989,672 B2 * | 3/2015 | Pascolini | H04B 1/525 455/63.1 |

(Continued)

FOREIGN PATENT DOCUMENTS

| WO | 2015094962 | 6/2015 |
| WO | 2015184460 | 12/2015 |

*Primary Examiner* — Fayyaz Alam
(74) *Attorney, Agent, or Firm* — Treyz Law Group, P.C.; G. Victor Treyz; Vineet Dixit (57) ABSTRACT

An electronic device may be provided with wireless circuitry. The wireless circuitry may include one or more antennas. An antenna may have an antenna feed that is coupled to a radio-frequency transceiver with a transmission line. An impedance matching circuit may be coupled to the antenna feed to match the impedance of the transmission line and the antenna. The impedance matching circuit and tunable circuitry in the antenna may be formed using integrated circuits. Each integrated circuit may include switching circuitry that is used in switching components such as inductors and capacitors into use. Sensors such as temperature sensors, current and voltage sensors, power sensors, and impedance sensors may be integrated into the integrated circuits. Each integrated circuit may store settings for the switching circuitry and may include communications and control circuitry for communicating with external circuits and processing sensor data.

20 Claims, 11 Drawing Sheets

(51) Int. Cl.
  *H04B 1/04*  (2006.01)
  *H04B 1/18*  (2006.01)

(56) References Cited

U.S. PATENT DOCUMENTS

| | | |
|---|---|---|
| 2008/0274706 A1 | 11/2008 | Blin |
| 2011/0250928 A1* | 10/2011 | Schlub .................. H01Q 1/243 |
| | | 455/550.1 |
| 2011/0300814 A1* | 12/2011 | Mikhemar ............... H04B 1/18 |
| | | 455/84 |
| 2012/0178386 A1* | 7/2012 | Pascolini ............... H04B 1/525 |
| | | 455/84 |
| 2013/0122836 A1* | 5/2013 | Desclos ............... H04B 1/0458 |
| | | 455/121 |
| 2013/0241800 A1 | 9/2013 | Schlub et al. |
| 2014/0100004 A1* | 4/2014 | Yarga ..................... H01Q 1/243 |
| | | 455/575.8 |
| 2015/0310995 A1* | 10/2015 | Ranta ................. H03M 1/1061 |
| | | 361/281 |
| 2015/0364822 A1 | 12/2015 | O'Driscoll |
| 2016/0197643 A1* | 7/2016 | Uejima ..................... H01P 5/16 |
| | | 455/73 |

* cited by examiner

ELECTRONIC DEVICE HAVING ANTENNA TUNING INTEGRATED CIRCUITS WITH SENSORS

This application claims the benefit of provisional patent application No. 62/101,901 filed on Jan. 9, 2015, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, the presence of conductive structures can influence antenna performance. For example, the presence of conductive housing structures or other device structures may limit the volume available for implementing antennas. This can adversely affect antenna bandwidth. Antenna tuning techniques may be used to compensate for limited antenna bandwidth, but unless a tunable antenna is operated appropriately, antenna performance may be degraded due to nonlinearities and detuning effects.

It would therefore be desirable to be able to provide improved wireless circuitry for electronic devices such as improved antenna circuitry.

SUMMARY

An electronic device may be provided with wireless circuitry. The wireless circuitry may include one or more antennas. An antenna may have an antenna feed that is coupled to a radio-frequency transceiver with a transmission line. An impedance matching circuit may be coupled to the antenna feed to match the impedance of the transmission line and the antenna. The antenna may also have adjustable circuitry for tuning the antenna. For example, the antenna may have a tunable circuit that is coupled between a resonating element and an antenna ground.

The impedance matching circuit and adjustable antenna tuning circuitry in the antenna may be formed from using integrated circuits. Each integrated circuit may include switching circuitry that is used in switching components such as inductors and capacitors into use. Sensors such as temperature sensors, current and voltage sensors, power sensors, and impedance sensors may be formed within the integrated circuits. Each integrated circuit may store settings for the switching circuitry and may include communications and control circuitry. The communications and control circuitry may be used to process sensor data and to support communications with external circuits.

DETAILED DESCRIPTION

Figure 1:
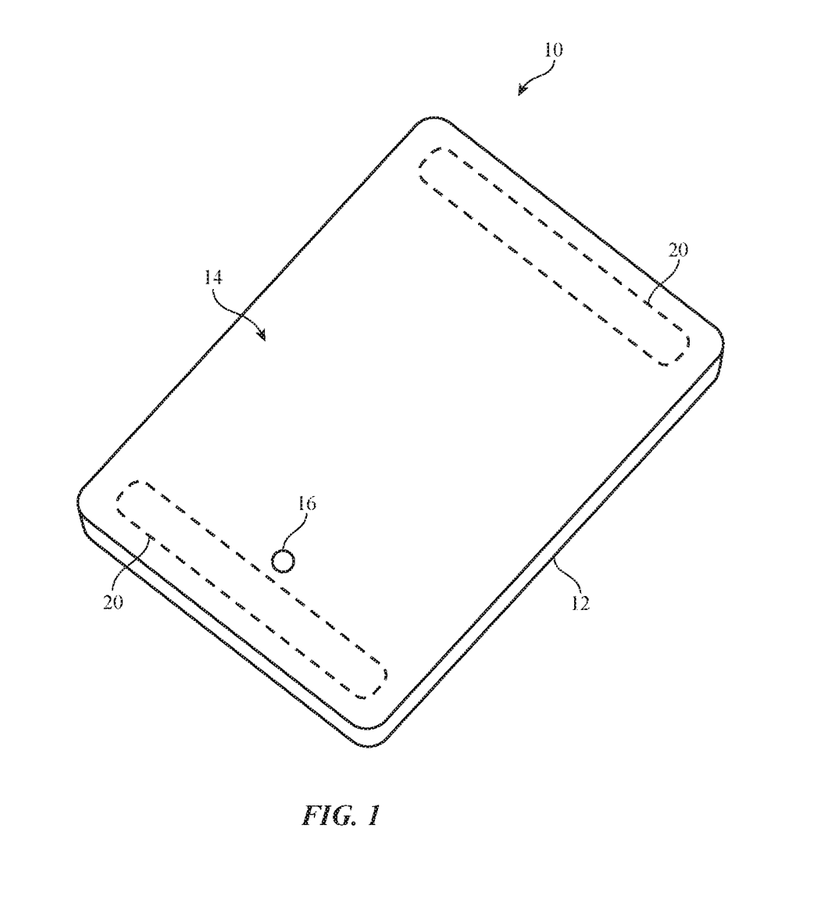
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. Tunable circuits may be used to adjust the wireless circuitry. The tunable circuits may include one or more integrated circuits. Sensors may be incorporated into the tunable circuits. For example, sensors may be formed on the integrated circuits. Information from the sensors may be used in adjusting the tunable circuits and otherwise operating the wireless circuitry of electronic device 10.

The wireless circuitry of device 10 may, for example, include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). If desired, device 10 may also contain wireless communications circuitry for implementing near-field communications, light-based wireless communications, or other wireless communications (e.g., communications at 13.56 MHz, communications at 60 GHz, etc.).

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.). Openings in housing 12 may also be formed for audio components such as a speaker and/or a microphone.

Antennas may be mounted in housing 12. For example, housing 12 may have four peripheral edges as shown in FIG. 1 and one or more antennas may be located along one or more of these edges. As shown in the illustrative configuration of FIG. 1, antennas may, if desired, be mounted in regions 20 along opposing peripheral edges of housing 12 (as an example). Antennas may also be mounted in other portions of device 10, if desired. The configuration of FIG. 1 is merely illustrative.

Figure 2:
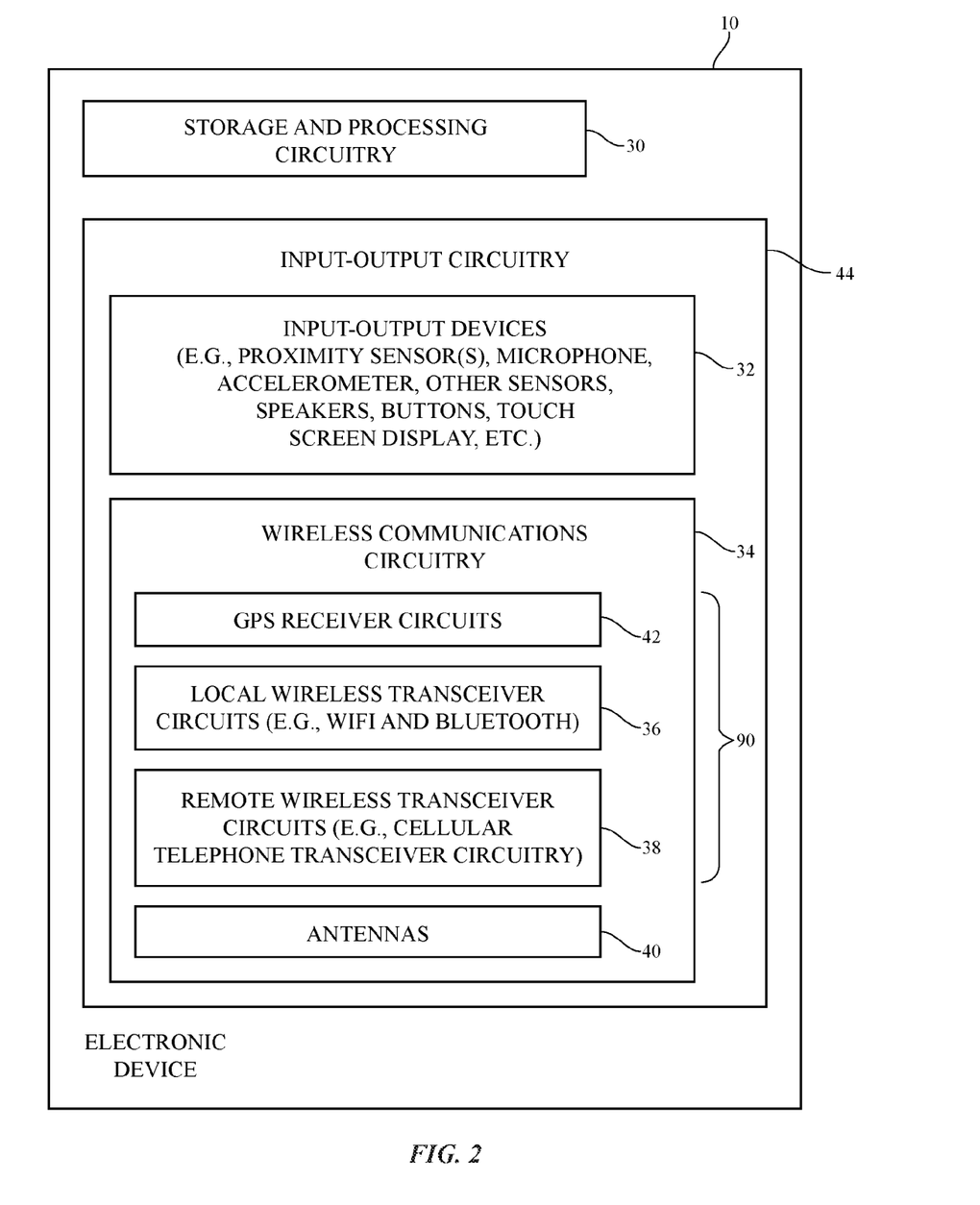
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band.

Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc.

Wireless communications circuitry 34 may include satellite navigation system circuitry such as global positioning system (GPS) receiver circuitry 42 for receiving GPS signals at 1575 MHz or for handling other satellite positioning data (e.g., GLONASS signals at 1609 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles. Satellite navigation system signals for receiver 42 are received from a constellation of satellites orbiting the earth.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals).

Transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while the other antenna(s) may be switched out of use. If desired, control circuitry 30 may be used to select an optimum antenna to use in device 10 in real time and/or an optimum setting for tunable wireless circuitry associated with one or more of antennas 40. Sensors may be incorporated into antennas 40 to gather sensor data in real time that is used in adjusting antennas 40.

Figure 3:
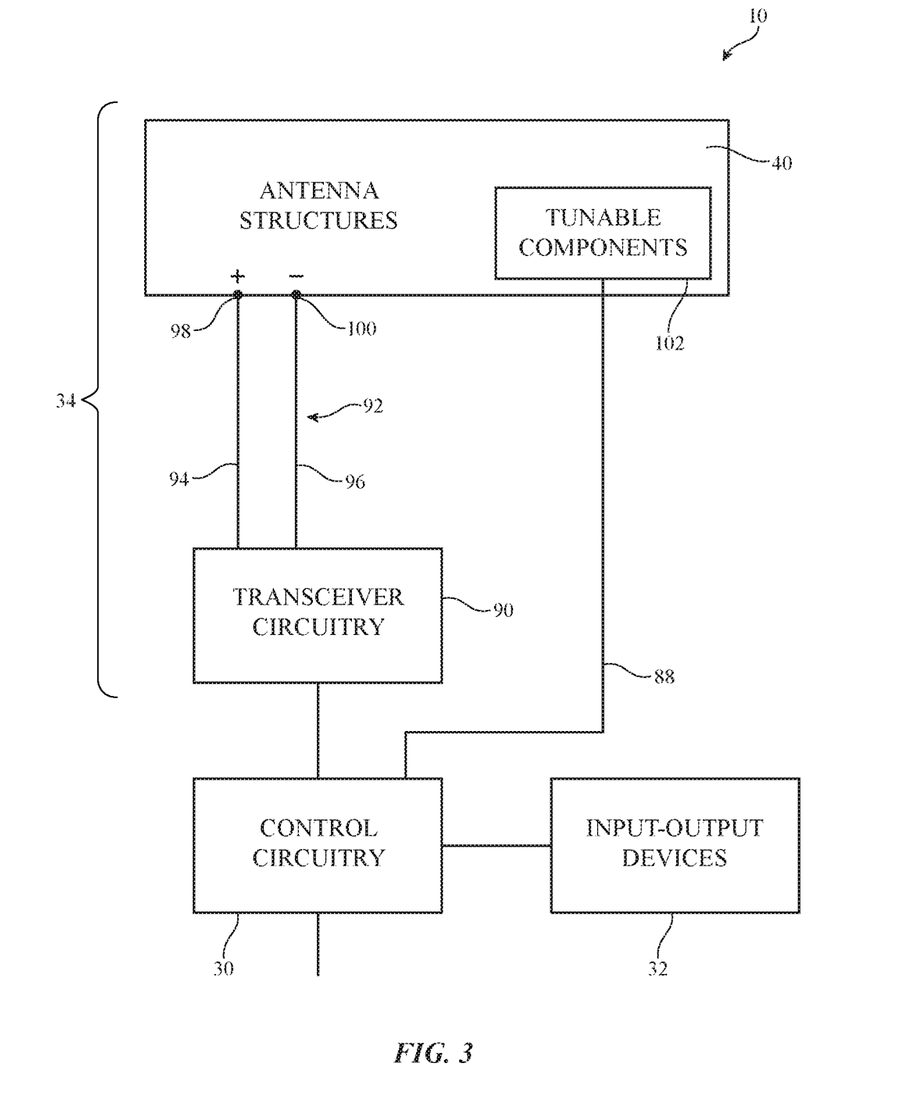
FIG. 3 is a diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 30. Control circuitry 30 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 102 to tune antennas over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 30 may issue control signals on one or more paths such as path 88 that adjust inductance values, capacitance values, or other parameters associated with tunable components 102, thereby tuning antenna structures 40 to cover desired communications bands. Configurations in which antennas 40 are fixed (not tunable) may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). An impedance matching network (matching circuit) formed from components such as inductors, resistors, and capacitors may be used in matching the impedance of antenna structures 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna structures 40.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Tunable circuitry for an antenna may be incorporated into a tunable matching network (e.g., an adjustable impedance matching circuit coupled to feed terminals 98 and 100) and/or an antenna aperture tuner (e.g., tunable circuitry coupled to an antenna resonating element or other structure in an antenna that adjusts the resonant behavior of the antenna and therefore its frequency response). One or more integrated circuits may be used in implementing tunable circuits such as tunable inductors, tunable capacitors, switches for switching a desired inductor and/or capacitor into use and thereby adjusting an inductance or capacitance value for an antenna, etc. These integrated circuits may include sensors. Data from the sensors may be used in real time to determine how to make adjustments to the tunable circuits and how to make other wireless circuit adjustments.

Figure 4:
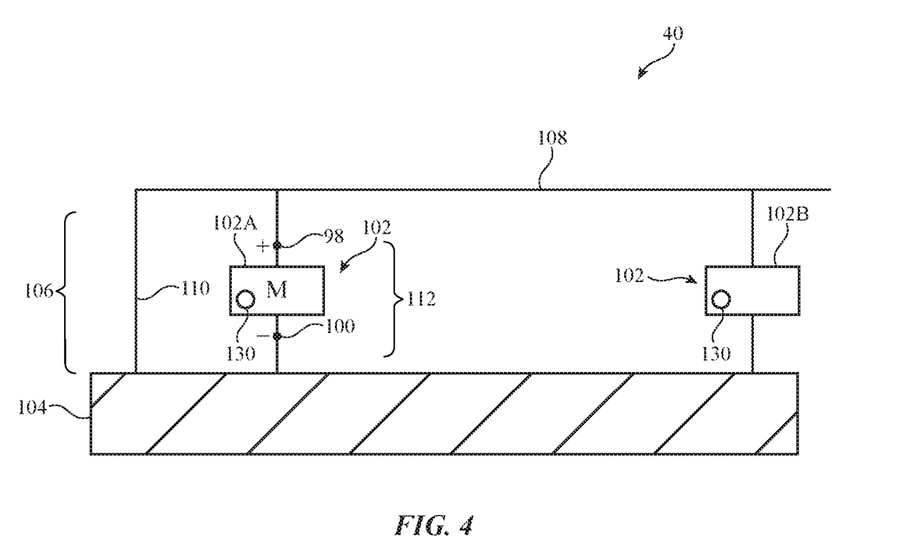
FIG. 4 is a diagram of an illustrative antenna in accordance with an embodiment.

Tunable circuits and sensors may be incorporated into any suitable type of antenna (patch, loop, slot, planar inverted-F, inverted-F, an antenna that includes multiple antenna structures such as these, etc.). Consider as an example, an illustrative antenna such as inverted-F antenna 40 of FIG. 4. As shown in FIG. 4, inverted-F antenna 40 has antenna resonating element 106 and antenna ground (ground plane) 104. Antenna resonating element 106 may have a main resonating element arm such as arm 108. The length of arm 108 may be selected so that antenna 40 resonates at desired operating frequencies. For example, the length of arm 108 may be a quarter of a wavelength at a desired operating frequency for antenna 40. If desired, inverted-F antennas such as illustrative antenna 40 of FIG. 4 may have more than one resonating arm branch (e.g., to create multiple frequency resonances to support operations in multiple communications bands). Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run parallel to return path 110 between arm 108 and ground 104. Antenna 40 of FIG. 4 may be a planar inverted-F antenna (e.g., arm 108 may have planar metal structures that run into the page in the orientation of FIG. 4) or may be formed from non-planar structures.

Antenna 40 include tunable components 102 such as tunable impedance matching circuit 102A and aperture tuning circuit 102B. Circuit 102B is coupled between arm 108 and ground 104 in the example of FIG. 4, but this is merely illustrative. Tunable circuits such as circuit 102B may be coupled within arm 108, may be interposed within return path 110, may form part of antenna ground 104, may be incorporated into a parasitic antenna resonating element, or may be incorporated into other antenna structures for antenna 40.

Circuit 102A and circuit 102B may be adjusted to adjust the performance of antenna 40 during operation of device 10. For example, the presence of an external object in the vicinity of antenna 40 may detune antenna 40. Using circuitry such as circuitry 102A and 102B, antenna 40 can be adjusted to compensate for loading experienced due to the presence of the external object. Sensors such as sensors 130 and/or other sensors may be incorporated into device 10 in wireless circuitry 34 to gather information on the operating conditions of antenna 40 and device 10. Sensors 130 may include, for example, temperature sensors for monitoring the current operating temperature of antenna 40 and device 10, current monitoring circuitry for measuring antenna currents, voltage monitoring circuitry for monitoring antenna voltages, power monitoring circuitry for making antenna signal power measurements, and impedance measurement circuitry for making impedance measurements (e.g., impedance measurements on matching circuit 102A, impedance measurements on antenna 40, measurements of the impedance of a portion of antenna 40, etc.). Sensor data from sensors 130 may be used to adjust the operation of antenna 40 (e.g., tunable circuits 102A and 102B), and to make other adjustments to the operation of device 10 (e.g., output power adjustments, antenna port adjustments, modulation scheme adjustments, radio access technology adjustments, etc.). With one suitable arrangement, some or all of the tunable circuitry of circuits such as circuits 102A and 102B may be implemented on one or more integrated circuits and sensors 130 may be implemented on these integrated circuits. By co-locating sensors 130 and the switches and other adjustable circuitry of circuits 102A and 102B on common integrated circuit die, space within device 10 can be conserved and local (on-chip) processing circuits may be used to help process sensor signals for making real time antenna adjustments.

Figure 5:
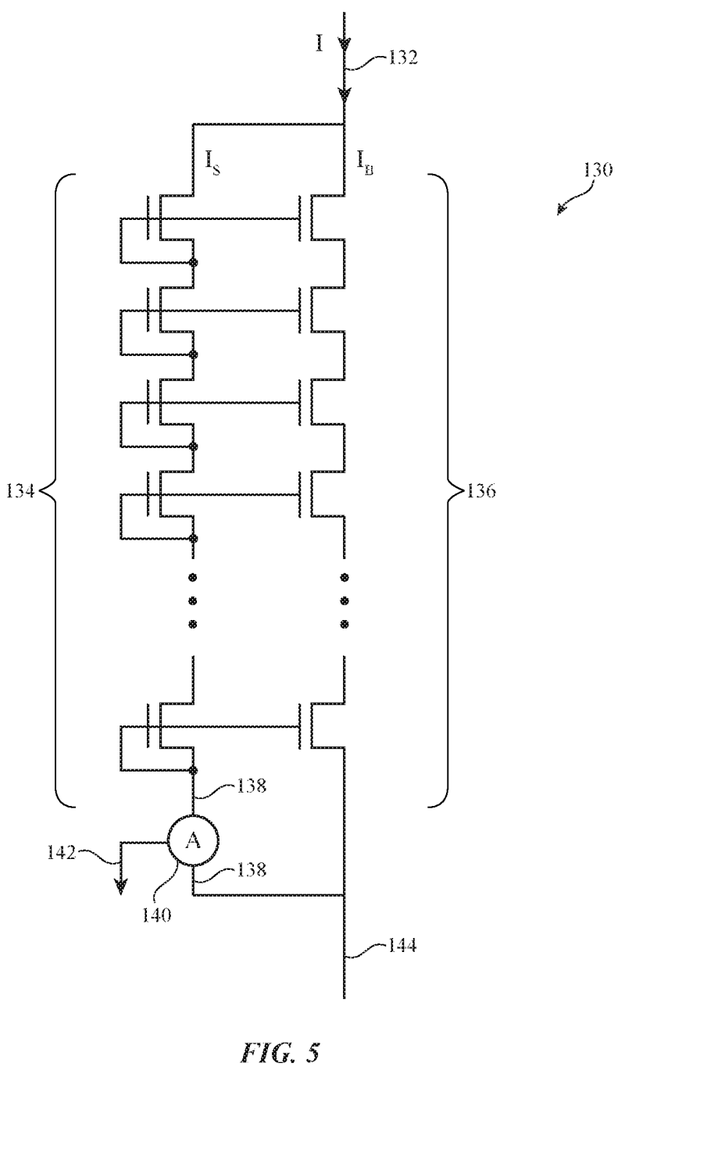
FIG. 5 is a diagram of an illustrative current sensor in accordance with an embodiment.

FIG. 5 is a circuit diagram of an illustrative current sensor. As shown in FIG. 5, current sensor 130 may have parallel branches of transistors such as transistor branch 134 and transistor branch 136 coupled in a current mirror configuration between terminal 132 and terminal 144. Sensor 130 may measure current I flowing between terminals 132 and 144. Each branch of transistors may have a chain of series-connected transistors. The ratio of the sizes of the transistors in the respective branches determines the ratio of current Is to current Ib flowing in branches 134 and 136, respectively.

With one suitable arrangement, most of current I flows through main branch 136 and a small representative portion of current I flows through secondary branch 134. The ratio of Is to Ib is known, so measurement of the magnitude of current Is can be used to determine Ib and therefore total current I. The value of current Is can be measured using digital ammeter 140 interposed within portion 138 of branch 134. Ammeter 140 may contain an analog-to-digital converter that allows current measurements such as the values of Is, Ib, and/or I to be supplied as digital output signals on digital output path 142. If desired, ammeter 140 or other portion of current sensor 130 may contain nonlinear circuit elements to help convert high-frequency radio-frequency antenna signals to lower frequency signals on which current measurements may be made.

Figure 6:
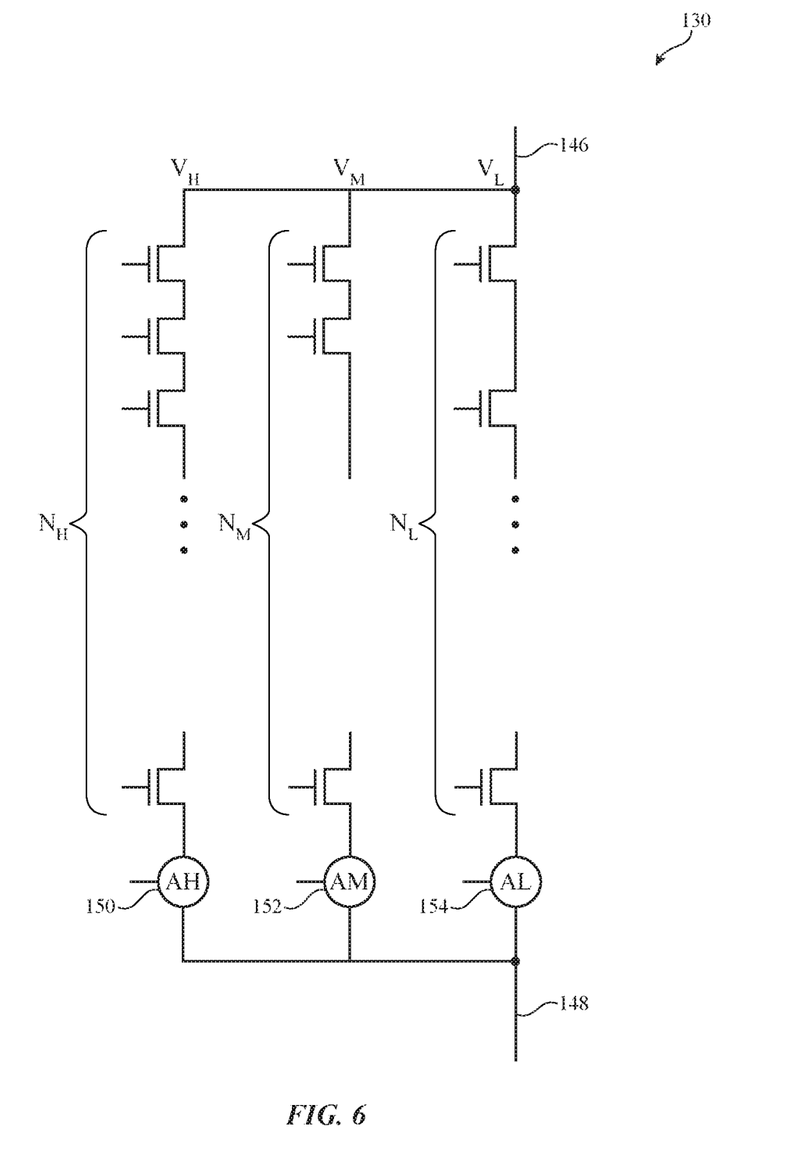
FIG. 6 is a diagram of an illustrative voltage sensor in accordance with an embodiment.

FIG. 6 is a circuit diagram of an illustrative voltage sensor. Voltage sensor 130 of FIG. 6 may make voltage measurements on signals applied across terminals 146 and 148. Multiple parallel branches of transistor stacks such as branches Nh, Nm, and Nl may extend between terminals 146 and 148. The transistors of sensor 130 may be field-effect transistors (FETs) that contain parasitic bipolar transistors and are characterized by a snap-back voltage (e.g., 3 V or other suitable voltage). Each branch of transistors may contain a different number of transistors coupled in series between terminals 146 and 148. The number of transistors in each branch establishes a threshold voltage for current flow for that branch. Each branch of sensor 130 will conduct current when its threshold voltage has been exceeded, but will not conduct current when the voltage across terminals 146 and 148 is lower than its threshold voltage.

Consider, as an example, a scenario in which the transistor snap-back voltage is 3 volts and in which branches Nh, Nm, and Nl contain 15, 10, and 5 transistors, respectively. In this illustrative configuration, branch Nh will be characterized by a threshold voltage Vh of 45 volts, branch Nm will be characterized by a threshold voltage Vm of 30 volts, and branch Nl will be characterized by a threshold voltage Vl of 15 volts. A current sensor may be coupled in series with each branch. For example, current sensor AH may be coupled in series with the transistors of branch Nh, current sensor AM may be coupled in series with the transistors of branch Nm, and current sensor AL may be coupled in series with the transistors of branch Nl. Each current sensor may supply an output signal on a respective output that is indicative of whether current is flowing through that sensor. For example, current sensor AH may provide output signals on output 150, current sensor AM may produce output signals on output 152, and current sensor Al may produce output signals on output 154. The signal on outputs 150, 152, and 154 may be digital signals (as an example).

If the voltage across terminals 146 and 148 is below Vl, no current will flow through the branches of sensor 130 and outputs 150, 152, and 154 will be deasserted. If the voltage across terminals 146 and 148 is between Vl and Vm, outputs 150 and 152 will be deasserted and output 154 will be asserted. When the voltage across terminals 146 and 148 exceeds Vm and is less than Vh, current sensors AM and AL will assert outputs 152 and 154, respectively, whereas output 150 will be deasserted (indicating that no current is flowing through branch Nh). If the voltage across terminals 146 and 148 is greater than Vh, the outputs of all three current sensors (i.e., outputs 150, 152, and 154 in this example) will be asserted.

The signals on the output path formed by outputs 150, 152, and 154 serves as digital voltage measurement data for sensor 130 that is indicative of the magnitude of the voltage across voltage sensor terminals 146 and 148. If desired, other numbers of transistors may be incorporated into each branch of sensor 130, transistors with different snap-back voltages may be used, etc. The configuration of FIG. 6 in which there are three parallel chains of series-connected transistors is merely illustrative.

Figure 7:
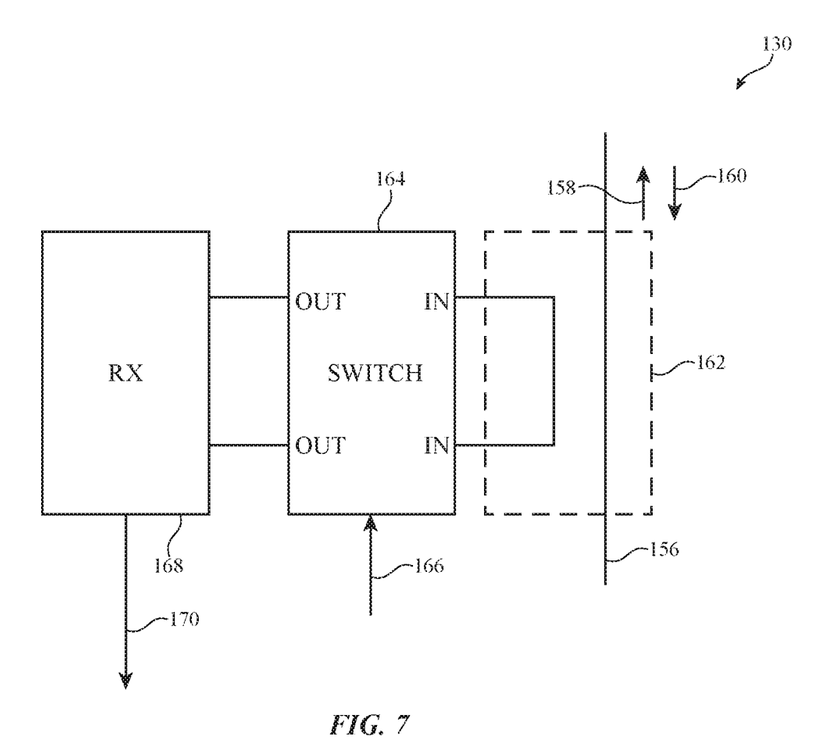
FIG. 7 is a diagram of an illustrative impedance sensor based on a directional coupler in accordance with an embodiment.

Illustrative sensors 130 of FIG. 7 may be used to make impedance measurements (e.g., complex s-parameter measurements that can be processed to produce impedance data). Impedance sensor 130 may make signal measurements on radio-frequency signals flowing on path 156 in direction 158 and direction 160. Directional coupler 162 taps signals flowing on path 156 and provides theses signals to input ports IN of switch 164. Switch 164 routes input signals on ports IN to output ports OUT for measurement by receiver 168. The state of switch 164, which can be controlled by applying control signals to control input 166, may be adjusted depending on whether tapped signals flowing in direction 158 or direction 160 are being measured.

During impedance measurements, phase and magnitude measurements may be made on the signals in path 156 (e.g., transmitted and reflected signals) using directional coupler 162, switch 164, and receiver 168. The output data from output 170 of receiver 168 may be processed to produce a corresponding impedance measurement. Impedance sensor 130 may be used to measure the impedance of an impedance matching circuit such as circuit 102A of FIG. 4 or may be used to measure impedance for antenna 40 (e.g., by incorporating impedance sensor 130 within an antenna aperture tuner circuit such as tunable circuit 102B of FIG. 4). In general, impedance sensor 130 may be used to make any suitable impedance measurement. The use of sensor 130 to measure impedance within circuits such as circuits 102A and 102B of FIG. 4 is merely illustrative.

Figure 8:
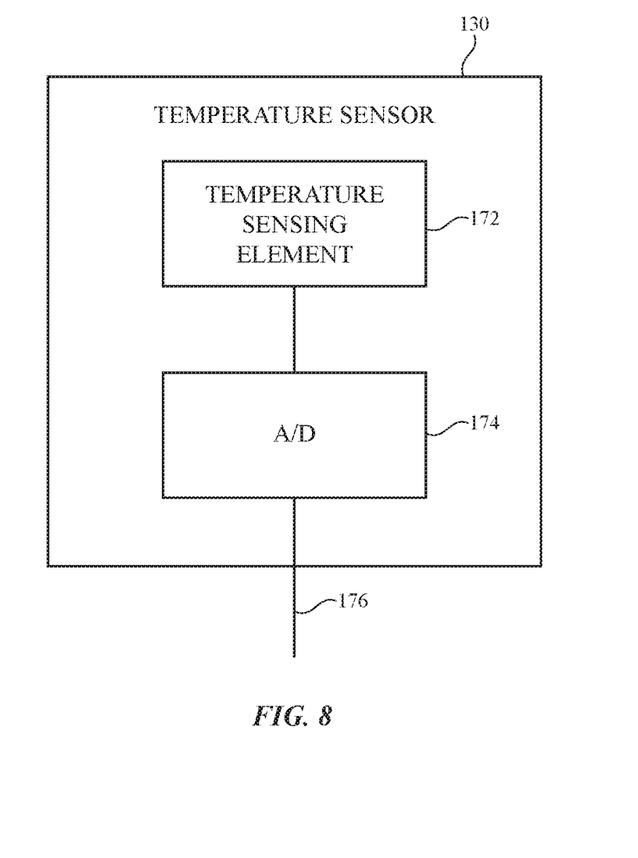
FIG. 8 is a diagram of an illustrative temperature sensor in accordance with an embodiment.

FIG. 8 is a diagram of an illustrative temperature sensor. As shown in FIG. 8, temperature sensor 130 may include a temperature sensing element such as temperature sensing element 172. Element 172 may be based on a thermocouple structure, a temperature-sensitive resistive element, a semiconductor device such as a transistor or diode with a current that varies as a function of temperature, and/or other temperature sensing circuitry. Analog-to-digital circuitry 174 may be used to produce digital output 176 that is indicative of the magnitude of the temperature measured using temperature sensing element 172. Temperature sensing element 172 may be used to measure the temperature of device 10 in the vicinity of sensing element 172, may be used to measure the temperature of an integrated circuit in which sensor 130 has been implemented, may be used to measure the temperature of transistors and other circuitry that is adjacent to sensor 130, and/or may be used in making other temperature measurements.

Figure 9:
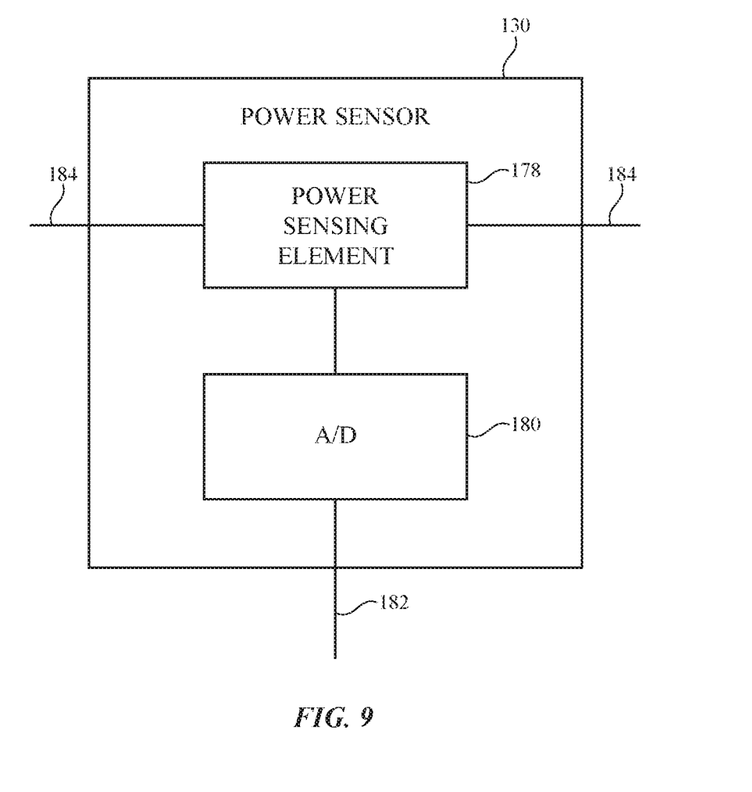
FIG. 9 is a diagram of an illustrative power sensor in accordance with an embodiment.

FIG. 9 is a diagram of an illustrative power sensor that may be used to make power measurements on radio-frequency signals such as antenna signals in device 10. As shown in FIG. 9, power sensor 130 may be interposed within path 184. Radio-frequency signals may flow along path 184 (e.g., to and from an antenna or other radio-frequency component, within a portion of an antenna or matching circuit, etc.). Power sensing element 178 may be coupled in path 184 and may be used to measure the power of radio-frequency signals flowing on path 184. Power sensing element 178 may be based on a diode, may contain one or more transistors, may contain nonlinear elements, or may contain other power measuring circuitry. Analog-to-digital converter circuitry 180 may be coupled to power sensing element 178 and may convert analog power measurements made with power sensing element 178 to digital power measurement data on output 182.

Figure 10:
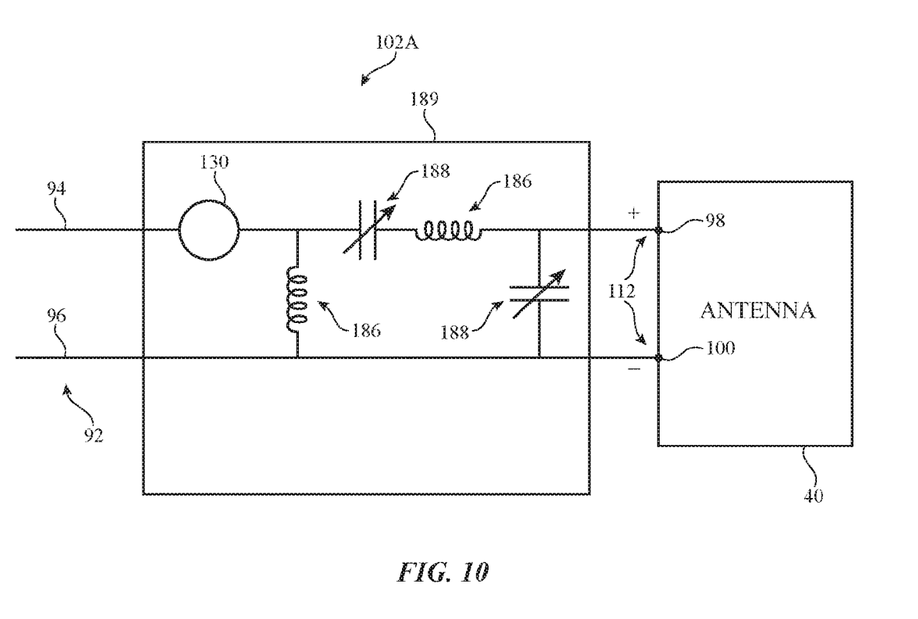
FIG. 10 is a diagram of an illustrative tunable antenna circuit such as a tunable impedance matching circuit in accordance with an embodiment.
Figure 11:
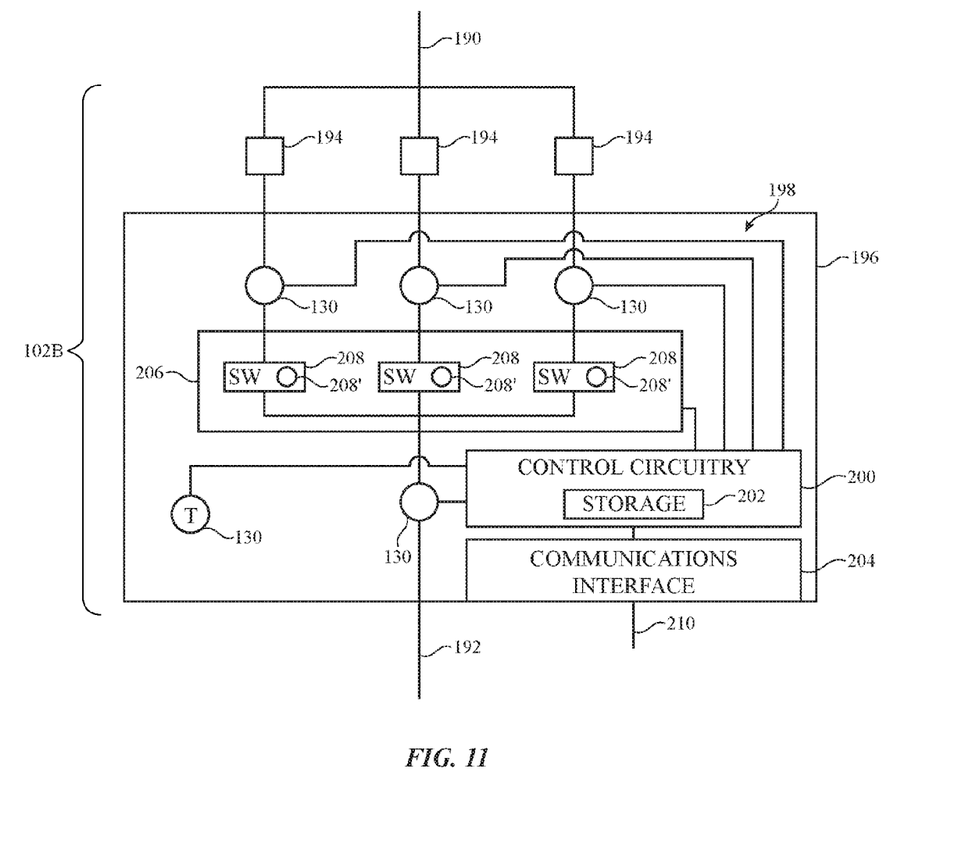
FIG. 11 is a diagram of an illustrative tunable antenna circuit such as an antenna aperture tuner in accordance with an embodiment.

FIGS. 10 and 11 are circuit diagrams of illustrative impedance matching and antenna aperture tuning circuits of the type that may be used in device 10. Illustrative locations at which sensors 130 may be incorporated into impedance matching circuit 102A and antenna tuning circuitry 102B are shown in FIGS. 10 and 11, respectively. These locations are, however, merely illustrative. Sensors 130 (e.g., current sensors, voltage sensors, temperature sensors, power sensors, impedance sensors, etc.) may be incorporated into wireless circuitry 34 at any suitable location(s).

In the example of FIG. 10, impedance matching circuit 102A is coupled across antenna feed terminals 98 and 100 in antenna feed 112. Antenna feed 112 is used to couple transmission line 92 to antenna 40. Transmission line 92 may include positive signal line 94 and ground signal line 96. Impedance matching circuit 102A may contain components such as series and shunt inductors 186 and series and shunt capacitors 188 (as an example). Circuit 102A may be implemented using an integrated circuit (e.g., a silicon-on-insulator integrated circuit, a silicon integrated circuit die, etc.) such as integrated circuit 189. Components such as inductors 186 and capacitors 188 may be implemented using structures on integrated circuit 189 or may be implemented using external components that are coupled to the terminals in integrated circuit 189.

Inductors 186 may be fixed inductors and/or adjustable inductors. Capacitors 188 may be fixed capacitors and/or adjustable capacitors. Other circuit components may be included in the circuitry of impedance matching circuit 102A if desired. The example shown in FIG. 10 in which matching circuit 102A includes a pair of fixed inductors and a pair of tunable capacitors is merely illustrative. During operation, sensors such as sensor 130 may be used to gather sensor data (e.g., current data, voltage data, temperature data, power data, impedance data, etc.). The sensor measurements made using sensor(s) 130 may be used in adjusting tunable circuitry such as tunable matching circuit 102A and/or other tunable antenna circuitry (see, e.g., tunable circuit 102B of FIG. 4) or may be used in making other adjustments to wireless circuitry 34 (e.g., transmit power adjustments, antenna port assignment adjustments, modulation scheme adjustments, communications frequency adjustments, etc.). As an example, real time sensor measurements made with sensor 130 in tunable matching circuit 130 may be used to determine how to make appropriate adjustments to tunable matching circuit 130 (e.g., adjustments to enhance wireless performance, adjustment to satisfy limits on transmitted power, adjustments to prevent undesired interference, etc.). Sensor 130 may be interposed in line 94 of path 92 or may be located at other portions of tunable matching circuit 102A.

Matching circuit 102A may be implemented using a semiconductor device such as a silicon integrated circuit (e.g., a silicon-on-insulator circuit, etc.). For example, circuit 102A may include switching circuitry, control circuitry, storage (e.g., registers for storing adjustable component settings), and communications interface circuitry. Some components of circuit 102A (e.g., discrete surface mount technology components such as SMT inductors or capacitors) may, if desired, be implemented using separate components mounted on a common printed circuit. For example, circuit 102A may have switch ports and fixed inductors that are used in conjunction with a switch in circuit 102A may be coupled to these switch ports. Preferably some or all of the circuitry of sensor 130 (e.g., sensing elements and/or analog-to-digital converter circuits, etc.) may be incorporated onto the same semiconductor device as the switching circuits and other integrated circuit portions of circuit 102A. The use of a common integrated circuit to implement some or all of impedance matching circuitry 102A and some or all of sensor 130 may help avoid unnecessary duplication of device components and may minimize space requirements for incorporating sensors into tunable circuits for wireless circuitry 34.

FIG. 11 shows how tunable antenna circuit 102B may include a semiconductor integrated circuit such as integrated circuit 196 (e.g., a silicon-on-insulator integrated circuit, a silicon integrated circuit, or an integrated circuit formed from another suitable semiconductor). In the illustrative configuration of FIG. 11, circuit 102B also includes external components such as components 194. Components 194 may be inductors (e.g., surface mount technology inductors), may be capacitors, or may be other external components that are coupled to the circuitry of integrated circuit 196 using traces on a printed circuit or other substrate.

Integrated circuit 196 may contain switching circuitry 206. Switching circuitry 206 may include transistor switches 208. Switches 208 may be formed from one or more transistors such as field-effect transistors. A circuit arrangement of the type shown in FIG. 11 may be used to implement a tunable component such as a tunable inductor. Components 194 and switching circuitry 206 may be coupled between terminals 190 and 192. Control circuitry may be used to supply control signals to switching circuitry 206 that direct switching circuitry 206 to switch one or more of components 194 into place between terminals 190 and 192. In this way, the inductance (or other circuit characteristics) of circuit 102B between terminals 190 and 192 may be adjusted in real time to tune antenna 40 or perform other adjustments to wireless circuitry 34. Switching circuitry such as switching circuitry 206 may be used in providing components such as components 186 and 188 of FIG. 10 with tuning capabilities (e.g., by switching internal and/or external components into use for circuit 102A of FIG. 10).

Sensors 130 may be incorporated into paths such as the paths between switches 208 and respective components 194, may be incorporated into a path between switching circuitry 206 and terminal 192, may be implemented as stand-alone sensors on the die of integrated circuit 196 (see, e.g., temperature sensor T of FIG. 11), or may be incorporated elsewhere in the circuitry of integrated circuit 196.

If desired, integrated circuit 196 (and integrated circuits such as integrated circuit 189 of FIG. 10) may include control circuitry 200. Control circuitry 200 may include a microcontroller or other hardwired circuitry that facilitates control operations for circuit 196 and other wireless circuitry 34. Storage 202 (e.g., registers, blocks of memory, etc.) may be included within control circuit 200. Storage 202 may be used to store settings for integrated circuit 196. For example, a switch setting for switching circuitry 206 may be stored in a register in storage 202. This register setting may be used, for example, to determine which of components 194 are switched into use. In an arrangement in which components 194 are inductors (e.g., external discrete inductors or inductors implemented as part of integrated circuit 196), the register setting may be used to establish a selected inductance value for circuit 102B between terminals 190 and 192. In an arrangement in which components 194 are capacitors, the register setting may be used to select a desired capacitance for circuit 102B. Tunable circuit 102B may, in general, include any suitable tunable circuits (e.g., switching circuitry 206, inductors, capacitors, etc.) and the settings of tunable circuit 102B may be adjusted by control circuitry 200 in real time based on settings loaded into storage 202 or based on control signals supplied to switching circuitry 206 from external control lines.

To facilitate communication with external control circuitry (e.g., a processor in control circuitry 30 of FIG. 3), antenna tuning integrated circuit 196 (and integrated circuits such as integrated circuit 189 of FIG. 10) may be provided with a communications interface such as communications interface 204. Interface 204 may be, for example, an RFFE interface (i.e., a communications interface compliant with the MIPI® Alliance radio-frequency front end specification). Other types of serial and parallel communications interfaces may be used for interface 204 if desired. Path 210 (e.g., a digital communications bus) may be used to convey signals between interface 204 and external control circuitry in device 10 (e.g., to provide sensor data from sensors 130 to external control circuitry, to receive control signals from external control circuitry that are to be stored in storage 202, or to otherwise support communications between integrated circuit 196 and other circuitry in device 10).

During operation, one or more sensors 130 on integrated circuit 196 may be used to gather data on the operating conditions of wireless circuitry 34. This data may be processed locally by control circuitry 200 in integrated circuit 196 and/or may be conveyed to control circuitry elsewhere in device 10 (see, e.g., control circuitry 30 of FIG. 2). Control circuitry external to integrated circuit 196 and/or control circuitry 200 within integrated circuit 196 may be used in adjusting the operation of adjustable wireless components. For example, the external and/or internal control circuitry may adjust switching circuitry 206 (e.g., switches 208) to switch a desired component 194 into use or to otherwise optimize performance.

Due to the presence of non-linear parasitics, there is a risk that wireless circuitry such as switching circuitry 206 will generate signal harmonics. Switches 208 may contain stacks of field-effect transistors. In an open-stack configuration, harmonics can arise from parasitic non-linear capacitances. In an ON state, a transistor stack may be characterized by non-linear parasitic resistances that can give rise to signal harmonics.

If desired, harmonics can be cancelled by appropriate adjustment of compensation circuits. For example, parasitics in a stack of field-effect transistors in a switch 208 can be compensated by appropriate adjustment of a non-linearity compensating circuit element 208' in that switch 208 (e.g., a parallel stack of field-effect transistors used for non-linearity compensation). These compensating adjustments to circuit elements 208' or other non-linearity compensating element may be made using data from sensors 130 (e.g., temperature data, voltage data, current data, impedance data, etc.). For example, temperature data, impedance data, current data, voltage data, power data, and other data from sensors 130 may be used to determine how to make circuit adjustments to elements 208' to minimize signal harmonics. If desired, the circuit adjustments that are made based on sensor data may be used to control gate biases and body biases for field-effect transistors (e.g., stacks of field effect transistors in switches 208, transistors in elements 208', etc.). Data from sensors 130 may also be used adjusting tunable components 102 of FIG. 3 (e.g., by adjusting switching circuitry 206, etc.). For example, data from sensors 130 may be used to tune circuitry 102A and/or 102B to compensate for antenna loading effects (e.g., impedance changes due to the presence of a body part of a user or other external object in the vicinity of antenna 40).

There may, in general, be any suitable number of antenna tuner switching modules with integrated sensors in device 10 (e.g., one or more integrated circuits 196 and/or one or more integrated circuits 189). There may be one circuit 196 used for implementing aperture tuning circuit 102B, there may be one circuit 189 used for implementing impedance matching circuit 102A, both circuits 102A and 102B may be implemented using a pair of integrated circuits, additional integrated circuits 196 and/or 189 may be incorporated into one or more antennas 40, etc.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   antenna structures that transmit and receive wireless signals;
   a tunable circuit coupled to the antenna structures to adjust the antenna structures, wherein the tunable circuit comprises:
   a plurality of electrical components; and
   an integrated circuit comprising:
      switching circuitry that includes a plurality of switches for selecting which of the plurality of electrical components are switched into use to adjust the antenna structures; and
      at least one sensor interposed between the plurality of switches and the plurality of electrical components.

2. The apparatus defined in claim 1 wherein the sensor comprises a sensor selected from the group consisting of: a voltage sensor, a current sensor, a temperature sensor, a power sensor, and an impedance sensor.

3. The apparatus defined in claim 1 wherein the electrical components comprise inductors.

4. The apparatus defined in claim 1 wherein the electrical components comprises capacitors.

5. The apparatus defined in claim 1 wherein the integrated circuit further comprises storage.

6. The apparatus defined in claim 5 wherein the storage stores settings for the switching circuitry.

7. The apparatus defined in claim 6 wherein the integrated circuit includes a communications interface.

8. The apparatus defined in claim 7 further comprising a digital bus coupled to the communications interface.

9. The apparatus defined in claim 1 further comprising:
   at least one non-linearity compensating element in the integrated circuit; and
   control circuitry that gathers data from the sensor, wherein the control circuitry is configured to adjust the non-linearity compensating element to reduce signal harmonics based on the gathered data.

10. The apparatus defined in claim 9 wherein the sensor comprises a temperature sensor and wherein the control circuitry adjusts the non-linearity compensating element based on temperature data from the temperature sensor.

11. The apparatus defined in claim 1 wherein the sensor comprises an impedance sensor having a directional coupler and a receiver and wherein the control circuitry adjusts the switching circuitry based on impedance data from the impedance sensor.

12. The apparatus defined in claim 1 wherein the antenna structures include an antenna resonating element, an antenna ground, and an antenna feed coupled to the antenna resonating element and the antenna ground, wherein the apparatus further comprises a transmission line coupled between a radio-frequency transceiver and the antenna feed, and wherein the tunable circuit comprises a tunable impedance matching circuit coupled to the antenna feed.

13. The apparatus defined in claim 1 wherein the antenna structures include an antenna resonating element arm and an antenna ground configured to exhibit at least one frequency resonance and wherein the tunable circuit is coupled between an end of the antenna resonating element arm and the antenna ground and is tuned to adjust the frequency resonance.

14. Apparatus, comprising:
   a radio-frequency transceiver;
   an antenna;
   a transmission line coupled between the radio-frequency transceiver and the antenna; and
   a tunable circuit coupled to the antenna, wherein the tunable circuit includes an integrated circuit, and wherein the integrated circuit comprises:
      switching circuitry that is adjusted to tune the tunable circuit; and
      a plurality of sensors coupled to the switching circuitry.

15. The apparatus defined in claim 14 wherein the integrated circuit further comprises control circuitry that receives sensor data from the plurality of sensors.

16. The apparatus defined in claim 15 further comprising:
   a processor external to the integrated circuit;
   a digital communications bus; and
   a communications interface in the integrated circuit, wherein the processor receives the sensor data from the communications interface over the digital communications bus.

17. The apparatus defined in claim 15 wherein the switching circuitry includes transistors and at least one non-linearity compensating element that compensates for non-linearity in the transistors and wherein the control circuitry adjusts the non-linearity compensating element based on the sensor data.

18. The apparatus defined in claim 17 wherein the plurality of sensors comprises a temperature sensor.

19. The apparatus defined in claim 17 wherein the plurality of sensors comprises current sensor that includes a current mirror and an ammeter with a digital output.

20. The apparatus defined in claim 17 wherein the plurality of sensors comprises a voltage sensor with a plurality of parallel chains of transistors each coupled to a respective current sensor.

* * * * *